(12) United States Patent
Kubo et al.

(10) Patent No.: US 9,599,774 B2
(45) Date of Patent: Mar. 21, 2017

(54) OPTICAL FIBER WIRING METHOD AND ITS DEVICE

(75) Inventors: Juichi Kubo, Ueda (JP); Kazumasa Ikushima, Mitaka (JP)

(73) Assignees: JUICHI KUBO, Nagano (JP); MUSASHI ENGINEERING, INC., Tokyo (JP)

( * ) Notice: Subject to any disclaimer, the term of this patent is extended or adjusted under 35 U.S.C. 154(b) by 721 days.

(21) Appl. No.: 10/572,377

(22) PCT Filed: Sep. 15, 2004

(86) PCT No.: PCT/JP2004/013448
§ 371 (c)(1),
(2), (4) Date: Feb. 1, 2007

(87) PCT Pub. No.: WO2005/029144
PCT Pub. Date: Mar. 31, 2005

(65) Prior Publication Data
US 2007/0264425 A1    Nov. 15, 2007

(30) Foreign Application Priority Data
Sep. 17, 2003    (JP) .................................. 2003-325087

(51) Int. Cl.
*G02B 6/02*    (2006.01)
*G02B 6/36*    (2006.01)
(Continued)

(52) U.S. Cl.
CPC ............. *G02B 6/3612* (2013.01); *G02B 6/43* (2013.01); *G02B 6/4239* (2013.01)

(58) Field of Classification Search
CPC ................................ G02B 6/43; G02B 6/3612
(Continued)

(56) References Cited

U.S. PATENT DOCUMENTS 3,742,107 A * 6/1973 Hawkins ...................... 264/1.29
3,960,530 A * 6/1976 Iyengar ................... B29C 47/02
                                                        118/405
(Continued)

FOREIGN PATENT DOCUMENTS

EP    1061393 A1    6/2000
EP    1 061 393 A1    12/2000
(Continued)

OTHER PUBLICATIONS

Translation of Hisatsune, JP61-625757, Translation dated Jan. 6, 2010.*

*Primary Examiner* — Daniel McNally
(74) *Attorney, Agent, or Firm* — Westerman, Hattori, Daniels & Adrian, LLP

(57) ABSTRACT

To eliminate such shortcomings in the prior art that a large-scale semiconductor facility is required, large-sized wiring cannot be produced, and wiring for connection between substrates cannot be formed. Also, to eliminate such shortcomings in a method of using optical fibers for wiring that the wiring is unstable, requires a larger space, and gives rise to a difficulty in management regarding how the optical fibers are connected when the number of optical fibers increases. Further, to eliminate such shortcomings in another method of holding and fixing an optical fiber between polymer sheets that wiring cannot be formed on a plate connecting substrates. In an optical fiber wiring method and apparatus, by feeding an optical fiber, preferably a polymer-made optical fiber, to pass through an adhesive ejecting nozzle having an inner diameter larger than an outer diameter of the optical fiber, the optical fiber coated with the adhesive on a fiber surface is obtained and optical wiring is formed on a substrate by using the adhesive-coated optical fiber. The optical wiring is formed on the substrate by moving the substrate and the nozzle relative to each other, (Continued)

for example, by moving the nozzle with the substrate held fixed, or by moving the substrate with the nozzle held fixed. The adhesive is of the type being hardened with irradiation of an ultraviolet ray. The optical wiring is formed on the substrate by irradiating an ultraviolet ray after the optical fiber coated with the adhesive on the fiber surface has been wired on the substrate.

6 Claims, 5 Drawing Sheets

(51) Int. Cl.
  *G02B 6/43* (2006.01)
  *G02B 6/42* (2006.01)
(58) Field of Classification Search
  USPC ............ 156/272.2, 166, 242, 244.12, 379.8,
           156/296.8; 385/14; 427/163.2, 207.4;
           118/620
  See application file for complete search history.

(56) References Cited

U.S. PATENT DOCUMENTS 4,693,778 A * 9/1987 Swiggett et al. ............ 156/361
4,950,866 A * 8/1990 Kojima ................ B23K 20/007
                                                    219/137 PS
5,186,781 A * 2/1993 Verville ........................ 156/169
5,534,101 A * 7/1996 Keyworth et al. ....... 156/244.12
6,005,991 A * 12/1999 Knasel ............................ 385/14
6,060,125 A * 5/2000 Fujii ..................... B05C 5/0225
                                                    222/518
6,527,142 B1 * 3/2003 Ikushima ........................ 222/61
6,568,074 B1   5/2003 Shahid
6,582,519 B1 * 6/2003 Berndt ........................ 118/420
6,778,754 B1 * 8/2004 Hirayama et al. ............ 385/147
2001/0011413 A1 * 8/2001 Yamaguchi et al. ............ 29/600
2002/0112821 A1 * 8/2002 Inaba et al. .................. 156/359
2005/0063839 A1 * 3/2005 Kazumasa .................... 417/415

FOREIGN PATENT DOCUMENTS

| JP | 61062575 A | * | 3/1986 | |
| JP | 64-78203 A | * | 3/1989 | ............. G02B 6/44 |
| JP | 8-179137 A | | 7/1996 | |
| JP | 11-119033 A | | 4/1999 | |
| JP | 11-248976 A | | 9/1999 | |
| JP | 2000-15160 A | * | 1/2000 | ............. B05C 5/00 |
| JP | 2003-112851 A | | 4/2003 | |
| WO | WO 02103202 A1 | * | 12/2002 | |
| WO | WO2005/029144 A1 | | 3/2005 | |

* cited by examiner

OPTICAL FIBER WIRING METHOD AND ITS DEVICE

TECHNICAL FIELD

The present invention relates to an optical fiber wiring method and apparatus which can efficiently transmit desired optical signals to desired places in a signal processing section for optical signals or a mixed combination of optical signals and electrical signals.

BACKGROUND ART

There are known three typical conventional methods for forming optical wiring. A first method comprises the steps of coating a glass film or a polymer film having high transmittance for light on a substrate, and forming the optical wiring on the substrate in a similar manner to that used for forming a circuit pattern in the LSI production process. More specifically, according to this first method, the optical wiring is formed by coating a photoresist on the surface of the glass film or the polymer film, exposing the photoresist to light through a mask having an optical wiring pattern, and removing unnecessary portions by etching. When a core portion and a clad portion are formed, the above-mentioned steps are repeated at least twice.

The first method is advantageous in, for example, capabilities of drawing a complicated pattern and forming an optical device as well. On the other hand, the first method has such shortcomings that a large-scale semiconductor facility is required, large-sized wiring cannot be produced, and wiring for connection between substrates cannot be formed.

A second method uses optical fibers to form optical wiring. This second method is simple, but it has such shortcomings that the wiring is unstable and requires a larger space, because the wiring is formed just by arranging the optical fibers in the form of bundles and fixing them by wires. Also, when the number of bundled optical fibers increases, a difficulty arises in managing how the optical fibers are connected.

According to a third method, an optical fiber is held and fixed between polymer sheets (Patent Document 1). This third method is advantageous in that, because the wiring is given in the patterned form, the fiber management is simple even when the number of optical fibers increases, and that a large-scale facility is not required. However, because of the structure holding the optical fiber between polymer sheets, the third method cannot form the optical wiring on a plate connecting substrates.

Patent Document 1: Japanese Patent Laid-Open No. 11-119033

DISCLOSURE OF THE INVENTION

Problems to be Solved by the Invention

The present invention is intended to solve such problems in the method of forming the optical wiring on the substrate in a similar manner to that used for forming a circuit pattern in the LSI production process that a large-scale semiconductor facility is required, large-sized wiring cannot be produced, and wiring for connection between substrates cannot be formed. Also, the present invention is intended to solve such problems in the method of using the optical fiber to form the optical wiring that the wiring is unstable, requires a larger space, and gives rise to a difficulty in managing how the optical fibers are connected when the number of optical fibers increases. Further, the present invention is intended to solve such problems in the method of holding and fixing the optical fiber between polymer sheets that wiring cannot be formed on a plate connecting substrates.

Means for Solving the Problems

To solve the above-mentioned problems, an optical fiber wiring method of the invention according to a first aspect is featured in comprising the steps of feeding an optical fiber to pass through an adhesive ejecting nozzle having an inner diameter larger than an outer diameter of the optical fiber, to thereby obtain the optical fiber coated with the adhesive on a fiber surface, and forming optical wiring on a substrate by using the adhesive-coated optical fiber. Also, the invention according to a second aspect is featured in that the optical wiring is formed on the substrate by moving the substrate and the nozzle relative to each other. The invention according to a third aspect is featured in moving the nozzle with the substrate held fixed, and the invention according to a fourth aspect is featured in moving the substrate with the nozzle held fixed.

Thus, in the inventions according to first to fourth aspects, the nozzle constituting a liquid material ejecting unit and/or a movable stage can be moved in accordance with an instruction from a controller. When only the nozzle is moved, the optical wiring can be formed in the X-axis direction, and when only the movable stage is moved, the optical wiring can be formed in the Y-axis direction. Also, when the nozzle and the movable stage are moved relative to each other, the optical wiring can be formed in an inclined line or a circular-arc line.

The invention according to a fifth aspect is featured, in the invention according to any one of the first to fourth aspects, in that the optical fiber is a polymer optical fiber. Further, the invention according to a sixth aspect is featured, in the invention according to any one of the first to fifth aspects, in that the adhesive is of the type being hardened with irradiation of an ultraviolet ray, and the optical wiring is formed on the substrate by irradiating an ultraviolet ray after the optical fiber coated with the adhesive on the fiber surface has been wired on the substrate.

In addition, to solve the above-mentioned problems, an optical fiber wiring apparatus according to a seventh aspect is featured in comprising a liquid material ejecting unit provided with a liquid material ejecting nozzle having an inner diameter larger than an outer diameter of an optical fiber and allowing the optical fiber and the adhesive to be simultaneously fed through the nozzle, and a stage for supporting a substrate on which the optical fiber is to be wired, wherein the liquid material ejecting unit and the stage are movable relative to each other. Also, the invention according to an eighth aspect is featured in that the stage for supporting the substrate is fixed and the nozzle is movable to form optical wiring on the substrate with the relative movement. The invention according to a ninth aspect is featured in that the nozzle is fixed and the stage for supporting the substrate is movable to form optical wiring on the substrate with the relative movement. Further, the invention according to a tenth aspect is featured in that the adhesive is of the type being hardened with irradiation of an ultraviolet ray, and the apparatus further comprises an ultraviolet ray irradiation unit for irradiating an ultraviolet ray to harden the adhesive after the optical fiber coated with the adhesive on the fiber surface has been wired on the substrate.

Advantages of the Invention

According to the optical fiber wiring method of the present invention, since expensive equipment, such as an LIS production facility, is not required and the LIS production facility is not employed, it is possible to form large-sized wiring and wiring for connection between substrates. Also, since the wiring is fixed by an adhesive, stable and space-saving wiring can be realized, and fiber management regarding how the optical fibers are connected is easy to perform even when the number of optical fibers increases. Further, since the optical fiber is neither held nor fixed between polymer sheets, the optical wiring can be formed on not only the substrate, but also on a plate connecting the substrates.

BRIEF DESCRIPTION OF THE INVENTION

Figure 1:
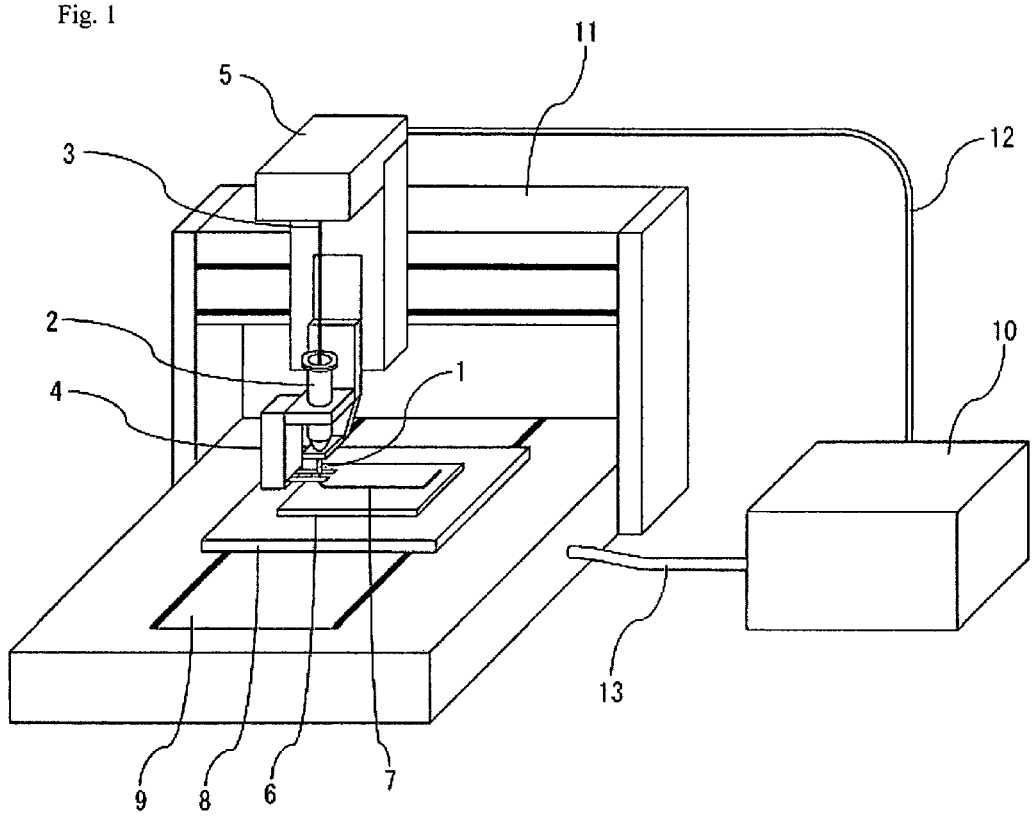
FIG. 1 is a schematic view showing the method and apparatus according to the present invention.
Figure 2:
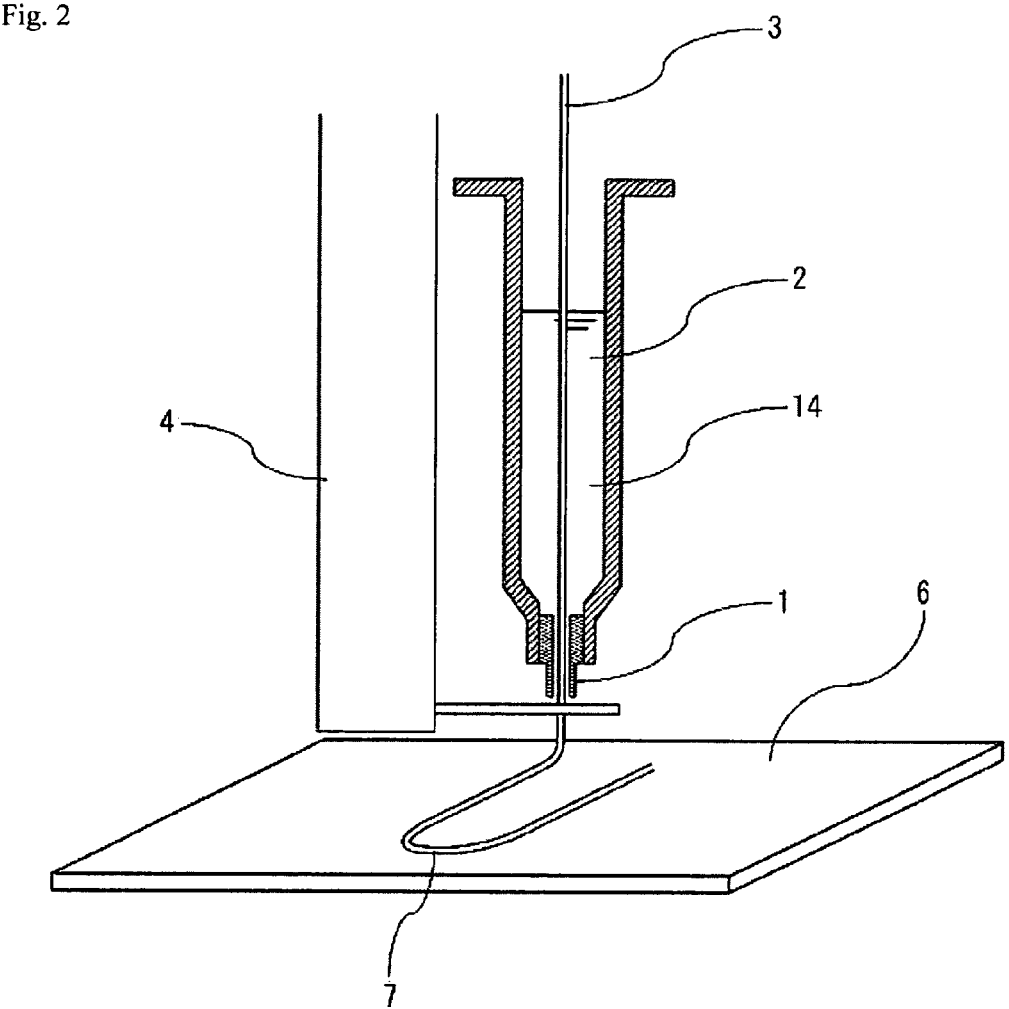
FIG. 2 is an explanatory view for explaining the optical wiring forming method according to the present invention.

REFERENCE NUMERALS 1 nozzle through which optical fiber and adhesive are simultaneously ejected
2 syringe filled with adhesive
3 optical fiber
4 cutter for cutting optical fiber
5 optical fiber supply unit
6 substrate on which optical wiring is to be formed
7 optical fiber coated with adhesive
8 movable stage
9 movable stage driving unit
10 controller for optical fiber supply unit, movable stage driving unit, etc.
11 support for supporting syringe and optical fiber supply unit
12 cord connecting optical fiber supply unit and controller
13 cord connecting movable stage driving unit and controller
14 adhesive
15 core portion of optical fiber
16 clad portion of optical fiber
17 pipe for feeding air to push out adhesive
18 cover for fixing syringe, pipe, and optical fiber to be fed
19 packing for preventing air leakage between syringe and cover
20 electro-optical substrate (board)
21 backboard for holding electro-optical substrate and electrical substrate and for connecting signals from electrical substrate to another substrate or another device
22 semiconductor chip for processing electric signals
23 electrical wiring on electro-optical substrate
24 semiconductor chip for performing photo-electrical conversion
25 arm for moving nozzle and syringe
26 ultraviolet ray irradiating unit

BEST MODE FOR CARRYING OUT THE INVENTION

An optical fiber and an adhesive are simultaneously ejected together through the tip of a nozzle having an inner diameter slightly larger than a diameter of the optical fiber used to form wiring, while the nozzle is moved on a substrate or a plate connecting substrates, or the substrate or the plate connecting the substrates is moved with the nozzle held fixed. The optical fiber coated with the adhesive is applied onto the substrate or the plate connecting the substrates in accordance with wiring drawing such that the optical fiber is bonded as per the drawing. As a result, optical wiring is formed on the substrate or the plate connecting the substrates.

Example 1

FIG. 1 is an explanatory view of Example 1 and schematically shows an optical fiber wiring apparatus of the present invention. In FIG. 1, reference numeral 1 denotes a nozzle through which the optical fiber and the adhesive are simultaneously ejected together, 2 denotes a syringe filled with the adhesive, 3 denotes the optical fiber, 4 denotes a cutter for cutting the optical fiber 3, 5 denotes an optical fiber supply unit, 6 denotes a substrate on which the optical wiring is to be formed, 7 denotes the optical fiber 3 coated with the adhesive, 8 denotes a movable stage, 9 denotes a movable stage driving unit, 10 denotes a controller for driving the optical fiber supply unit 5 and the movable stage driving unit 9, 11 denotes a support for supporting the syringe and the optical fiber supply unit 5, 12 denotes a cord connecting the optical fiber supply unit 5 and the controller 10, and 13 denotes a cord connecting the movable stage driving unit 9 and the controller 10.

Figure 3:
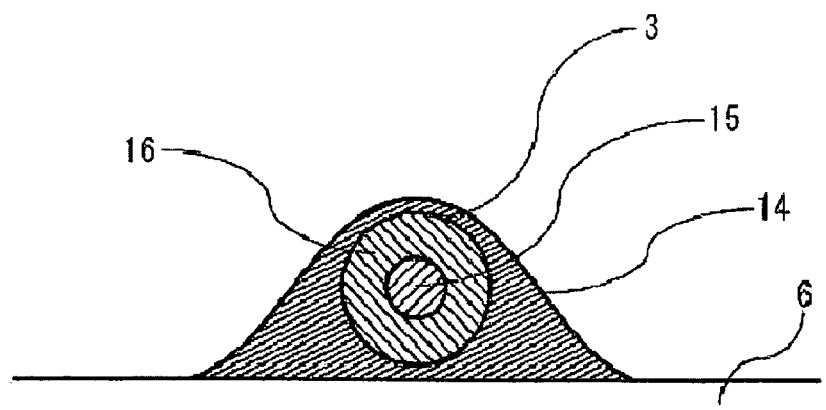
FIG. 3 is a sectional view of optical wiring formed according to the present invention.

FIG. 3 illustrates the optical fiber coated with an adhesive 14 in more detail. In FIG. 3, reference numeral 15 denotes a core portion of the optical fiber 3, and 16 denotes a clad portion of the optical fiber 3.

By using the adhesive 14 that is hardened with irradiation of an ultraviolet ray, a time required for hardening the adhesive can be cut.

To fabricate an optical fiber circuit, a program is written in the controller 10 in advance, and the movable stage 8 and the optical fiber supply unit 5 are driven at the same time. The optical fiber 3 is let out from the optical fiber supply unit 5 and is introduced to the syringe 2 filled with the adhesive 14. After the fiber surface has been wetted with the adhesive 14, the optical fiber 3 is ejected through the nozzle 1 together with the adhesive 14. The ejected optical fiber 3 reaches the substrate 6 while the substrate 6 is moved together with the stage 8 in the horizontal direction, whereby the optical fiber circuit is formed. This circuit is bonded and fixed to the substrate 6 by the adhesive 14. After a required length of the optical fiber 3 has been bonded onto the substrate 6, the optical fiber 3 is cut by the optical fiber cutter 4.

As a result, the optical wiring made of the optical fiber 3 coated with the adhesive 14 can be formed on the substrate 6. A light propagation loss of the thus-formed optical wiring is equal to that of the optical fiber used, and wiring including transfer paths crossed each other can be formed which cannot be formed in an optical circuit by using the LSI process. Further, it is possible to greatly cut the time required for fabricating the optical circuit, to reduce the cost required for the fabrication, and to achieve greater economy.

When the optical fiber 3 made of a polymer is used as the optical fiber 3, the core portion 15 and the clad portion 16 of the optical fiber 3 have relatively large sizes. Therefore, allowances are increased for not only pattern accuracy, but also for accuracy in connection between the optical fiber 3 and an optical part and in connection between one optical fiber 3 and another optical fiber 3, thus enabling the optical wiring to be more easily formed. Also, since the optical fiber 3 is flexible and the difference in refractive index can be increased between the core portion 15 and the clad portion 16, it is possible to reduce the radius of curvature of a fiber curve in the circuit, and to make the optical wiring more compact. Further, wetness and adhesion between the optical fiber 3 and the adhesive 14 are high, and these characteristics contribute to facilitating the fabrication of the optical wiring. In addition, after the fabrication of the optical wiring, the optical fiber 3 can be easily cut because it is soft.

Example 2

Figure 4:
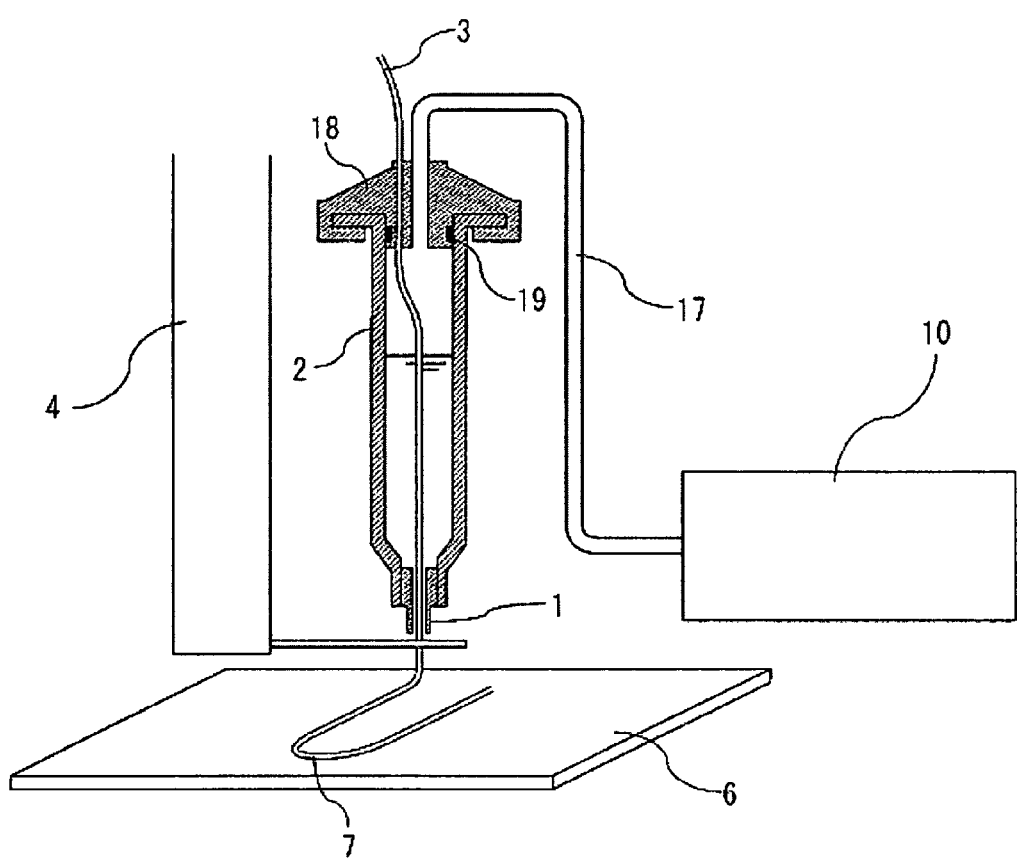
FIG. 4 is an enlarged view of a syringe section for controlling ejection of an optical fiber and ejection of an adhesive.

FIG. 4 is an explanatory view for explaining Example 2. In FIG. 4, reference numeral 17 denotes a pipe through which air is fed to push out the adhesive 14, and 18 is a cover for fixedly supporting the syringe 2, the pipe 17, and the optical fiber 3 to be fed. An inlet portion through which the optical fiber 3 is introduced is protected by a packing so as to prevent leakage of air. Reference numeral 19 in FIG. 4 denotes a packing to prevent leakage of air between the syringe 2 and the cover 18.

The feed speed of the optical fiber 3 and the air pressure for pushing out the adhesive 14 are both controlled by the controller 10. When the optical fiber 3 is wired in a linear shape, the feed speed of the optical fiber 3 is increased and the air pressure for pushing out the adhesive 14 is raised to eject a relatively large amount of the adhesive 14. Also, when the optical fiber 3 is wired in a curved shape along a corner or the like, the feed speed of the optical fiber 3 is decreased and the air pressure for pushing out the adhesive 14 is lowered to eject a relatively small amount of the adhesive 14. With that control, the amount of the adhesive 14 applied to the optical fiber 3 can be kept constant regardless of whether the optical fiber 3 is wired in a linear shape or a curved shape. It is therefore possible to eliminate drawbacks caused when the optical fiber 3 is bonded onto the substrate 6, i.e., to avoid peeling-off of the optical fiber 3 due to the deficient amount of the adhesive 14, as well as wasteful use of the adhesive 14 and extra spreading of the adhesive 14 over the surface of the substrate 6 due to the excessive amount of the adhesive 14.

Example 3

Figure 5:
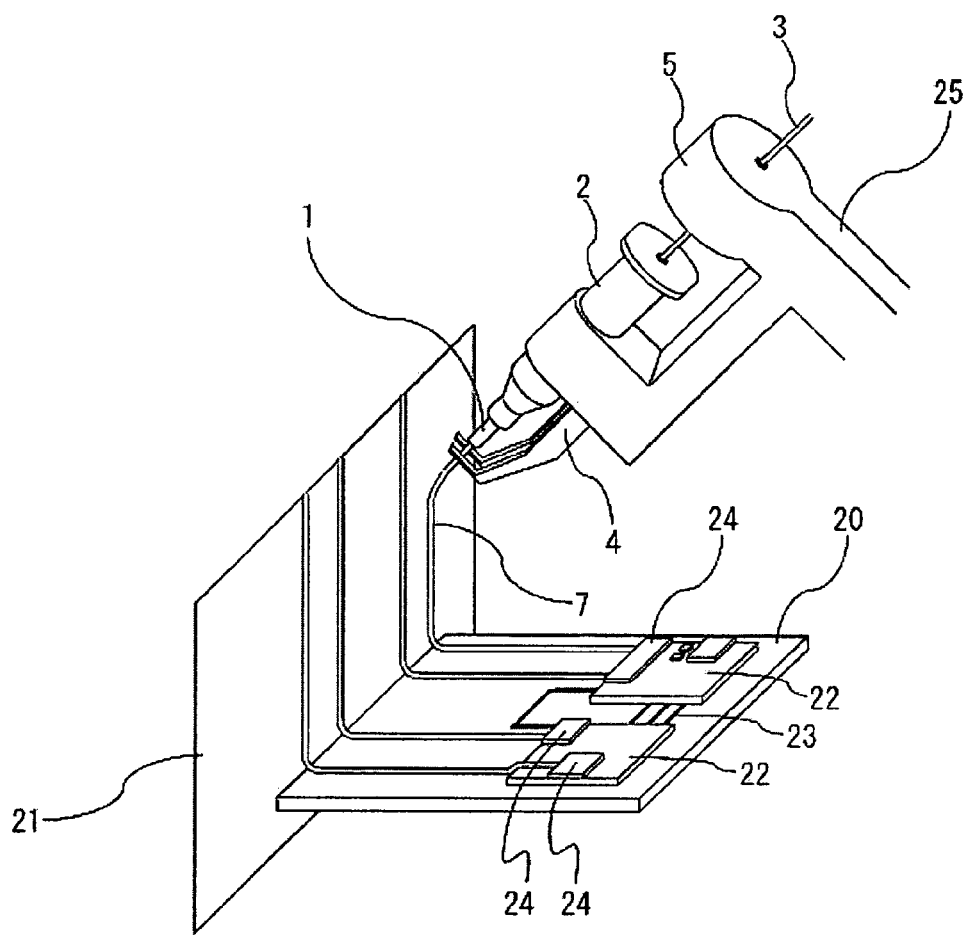
FIG. 5 is an explanatory view for explaining the method and apparatus according to the present invention, which can realize optical connection between a substrate and a backboard.

FIG. 5 is an explanatory view for explaining Example 3. In FIG. 5, reference numeral 20 denotes an electro-optical substrate (board), 21 denotes a backboard for holding the electro-optical substrate 20 and an electrical substrate and for connecting signals from the electrical substrate to another substrate or another device, 22 denotes a semiconductor chip for processing electric signals, 23 denotes electrical wiring on the electro-optical substrate 20, 24 denotes a semiconductor chip for performing photo-electrical conversion, and 25 denotes an arm for moving the drawing nozzle and the syringe.

The optical wiring requires to be formed not only on the same substrate, but also for connection between the substrate 20 and the backboard 21 and for another substrate-to-substrate connection via the connection between the substrate 20 and the backboard 21.

FIG. 5 shows a method and apparatus adaptable for such requirement. The nozzle 1, the syringe 2, the cutter 4 for cutting the optical fiber 3, and the optical fiber supply unit 5 are fixedly mounted to the arm 25. The arm 25 is moved under control by the controller 10 to form optical wiring on the electro-optical substrate 20, which mounts the semiconductor chip 22 for processing the electric signals and the semiconductor chip 24 for performing the photo-electrical conversion, in the same manner as that in Examples 1 and 2. Thereafter, the optical wiring is further formed so as to extend over the backboard 21 by operating the arm 25, as shown in FIG. 5. Thus, the method and apparatus of this example make it possible to easily realize the connection of optical signals between the substrate 20 and the backboard 21 and the connection of optical signals between one substrate and another substrate via the connection between the substrate 20 and the backboard 21.

Example 4

Figure 6:
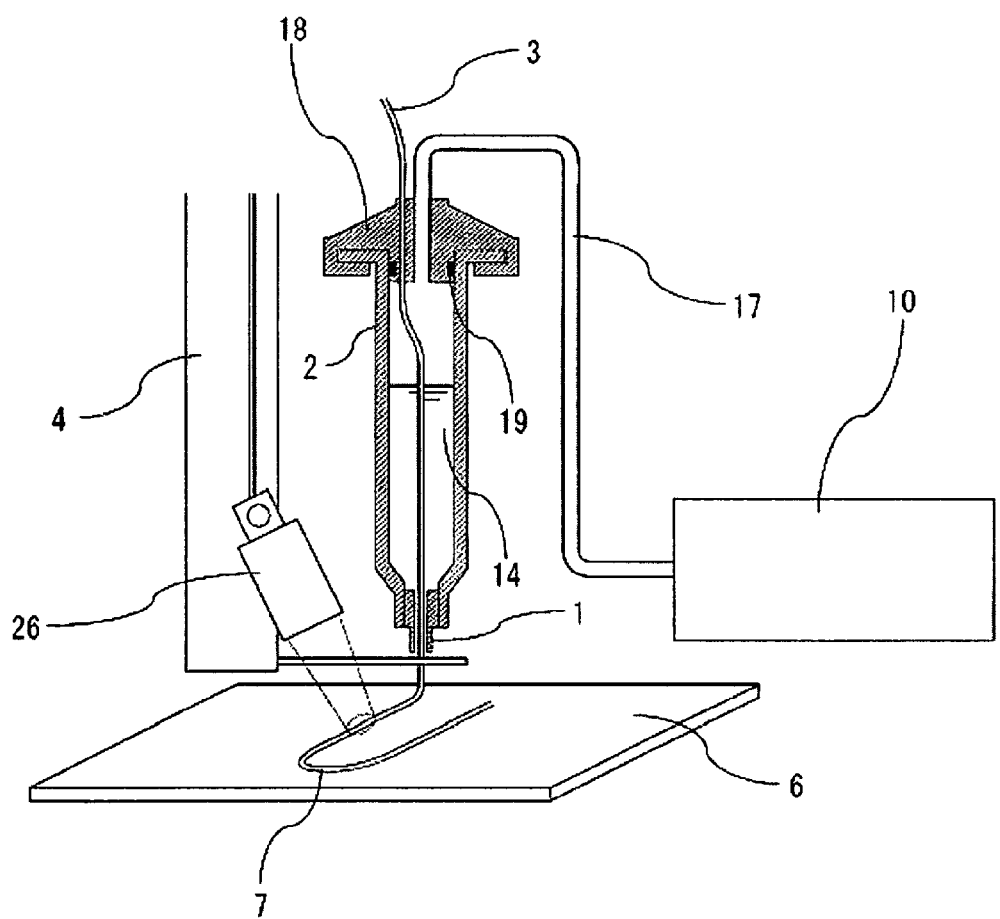
FIG. 6 is an explanatory view for explaining a step of forming the optical wiring with irradiation of an ultraviolet ray according to the present invention.

FIG. 6 is an explanatory view for explaining Example 4. In FIG. 6, reference numeral 26 denotes an ultraviolet ray irradiation unit.

After bonding, onto the substrate 6, the optical fiber 3 coated with the adhesive 14 that can be hardened with irradiation of an ultraviolet ray, the ultraviolet ray is irradiated to the adhesive 14 from the ultraviolet ray irradiation unit 26. As a result, the adhesive 14 is hardened at once and the optical wiring is completed.

It is to be noted that, in each of the above-described examples, the optical fiber 3 is supplied by using the optical fiber supply unit 5, but the optical fiber 3 can be ejected through the nozzle 1 with the flow of the adhesive ejected through the nozzle 1.

The invention claimed is:

1. An optical fiber wiring method comprising the steps of:
feeding an optical fiber to pass through a syringe holding a liquid adhesive, the syringe having an opening disposed at an upper end and an adhesive ejecting nozzle with an inner diameter larger than an outer diameter of the optical fiber, wherein the optical fiber passes through a liquid surface and is immersed in the liquid adhesive in the syringe, and the optical fiber coated with the liquid adhesive on a fiber surface exits from the adhesive ejecting nozzle; and
forming an optical fiber circuit on a surface of a workpiece by simultaneously ejecting the optical fiber and the liquid adhesive,
wherein the syringe does not have a port on its lateral surface,
wherein the syringe is covered with a cover for supporting the syringe and the optical fiber, the cover is detachably attached to the upper end,
wherein the cover includes an inlet portion through which the optical fiber is introduced, an air supply port and a packing to prevent leakage of air between the syringe and the cover, and wherein air pressure is applied on the liquid adhesive from the air supply port.

2. The optical fiber wiring method according to claim 1, wherein the workpiece comprises at least two substrates and the optical fiber circuit includes an optical connection between two substrates.

3. The optical fiber wiring method according to claim 2, wherein the optical connection includes an optical fiber which is wired on the two substrates in a manner that bridges and straddles the two substrates.

4. The optical fiber wiring method according to claim 1, wherein the optical fiber is ejected through the nozzle with the adhesive ejected through the nozzle.

5. The optical fiber wiring method according to claim 1, wherein the cover supports a pipe which is connected to the air supply port.

6. The optical fiber wiring method according to claim 1, wherein the optical fiber circuit includes a linear shape and a curved shape, wherein feeding speed of the optical fiber is increased when the optical fiber circuit is formed in the linear shape, and the feeding speed of the optical fiber is decreased when the optical fiber circuit is formed in the curved shape, and wherein a pressure for pushing out the adhesive is raised when feeding speed of the optical fiber is increased, and the pressure for pushing out the adhesive is lowered when feeding speed of the optical fiber is decreased.

\* \* \* \* \*